(12) United States Patent
Yasui

(10) Patent No.: US 6,989,737 B2
(45) Date of Patent: Jan. 24, 2006

(54) VEHICLE ANTITHEFT DEVICE

(75) Inventor: Katsuaki Yasui, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 72 days.

(21) Appl. No.: 10/397,615

(22) Filed: Mar. 27, 2003

(65) Prior Publication Data
US 2004/0075540 A1 Apr. 22, 2004

(30) Foreign Application Priority Data
Oct. 3, 2002 (JP) ............................. 2002-290875

(51) Int. Cl.
B60Q 1/00 (2006.01)

(52) U.S. Cl. .................. 340/426.1; 340/573.7; 382/118

(58) Field of Classification Search ..... 340/425.5–490, 340/825–825.9, 426.3, 459, 467, 474, 426.1; 382/118, 122; 307/10.3
See application file for complete search history.

(56) References Cited

U.S. PATENT DOCUMENTS

| | | | |
|---|---|---|---|
| 5,404,128 A | * | 4/1995 | Ogino et al. ............. 340/425.5 |
| 6,400,835 B1 | * | 6/2002 | Lemelson et al. .......... 382/118 |
| 6,686,845 B2 | * | 2/2004 | Oyama ....................... 340/575 |
| 2002/0152010 A1 | * | 10/2002 | Colmenarez et al. ......... 701/36 |

FOREIGN PATENT DOCUMENTS

| | | |
|---|---|---|
| JP | 10/230820 | 9/1998 |
| JP | 11-43016 | 2/1999 |
| JP | 11-328545 | 11/1999 |
| JP | 2000-085536 | 3/2000 |
| JP | 2002-019583 | 1/2002 |
| JP | 2003-095067 | 4/2003 |

* cited by examiner

Primary Examiner—Brent A. Swarthout
Assistant Examiner—George Bugg
(74) Attorney, Agent, or Firm—Sughrue Mion, PLLC

(57) ABSTRACT

Disclosed is a vehicle antitheft device not requiring a contract with a security company, etc., and increasing a vehicle antitheft effect. In the vehicle there are provided a camera or a microphone, and a control device for distinguishing a face or voice of a human by means of an image or sound captured by the camera or microphone, and based on distinction results, executing vehicle theft prevention control operations. The camera is provided at a position capable of capturing a normally seated driver and the outside through a window next to a driver's seat. Further, in the vehicle there is provided a radio communications unit. The control device records the captured image from the camera, judges whether the it is the face image of the person, and if it is, performs control so that the image is sent to a given reporting destination via the radio communications unit.

12 Claims, 3 Drawing Sheets

DCVEHICLE ANTITHEFT DEVICE

BACKGROUND OF THE INVENTION

1. Field of the Invention

The present invention relates to a vehicle antitheft device for preventing theft of an automobile.

2. Description of the Related Art

In a conventional vehicle antitheft device, a setting switch is set in an alert state, and when a door opening is detected with a signal from a sensor, a control device in an image transmission system judges that an abnormality has occurred based on the signal from the sensor, and it reports data indicating the occurrence of the abnormality, an image signal from a camera 4 and a voice signal collected by a microphone to a reporting destination such as a security company etc. stored in a reporting destination table via a radio communications unit (JP 11-328545 A, pages 2 to 3, FIG. 1, for example).

However, in the above-mentioned conventional vehicle antitheft device, it was necessary to enter into a contract with the security company etc. who serve as the reporting destination for reporting the abnormality, thereby being necessary to pay an expensive contract fee.

SUMMARY OF THE INVENTION

The present invention has been made in order to solve the above-mentioned problems, and an object thereof is to obtain a vehicle antitheft device which is not necessarily requiring a contract with a security company etc., and is capable of increasing a vehicle antitheft effect.

A vehicle antitheft device according to the present invention includes in the vehicle a camera or a microphone, and a control device for distinguishing a face or a voice of a human by means of an image or sound captured by the camera or the microphone, and based on the distinction results, for executing vehicle theft prevention control operations.

DETAILED DESCRIPTION OF THE PREFERRED EMBODIMENTS

Embodiment 1

Figure 1:
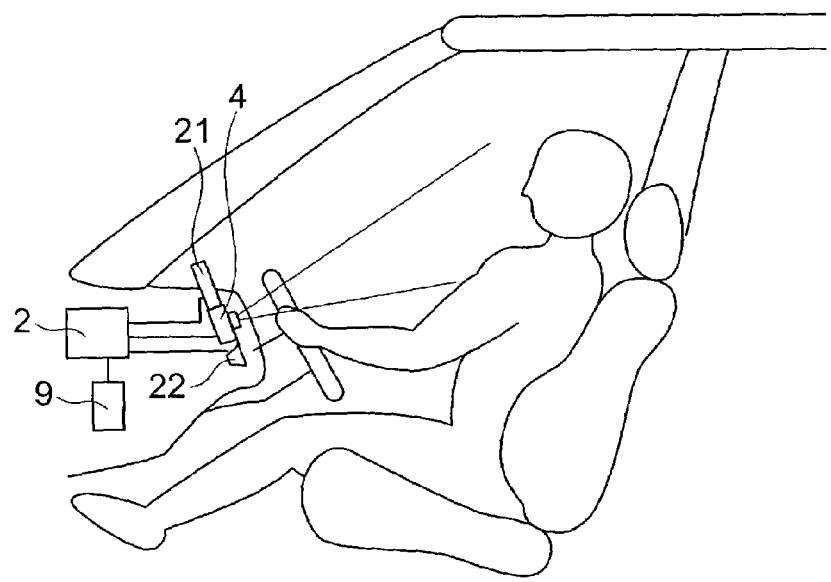
FIG. 1 is an explanatory diagram showing a structure of an instrument panel area of a vehicle antitheft device in accordance with Embodiment 1 of the present invention.
Figure 2:
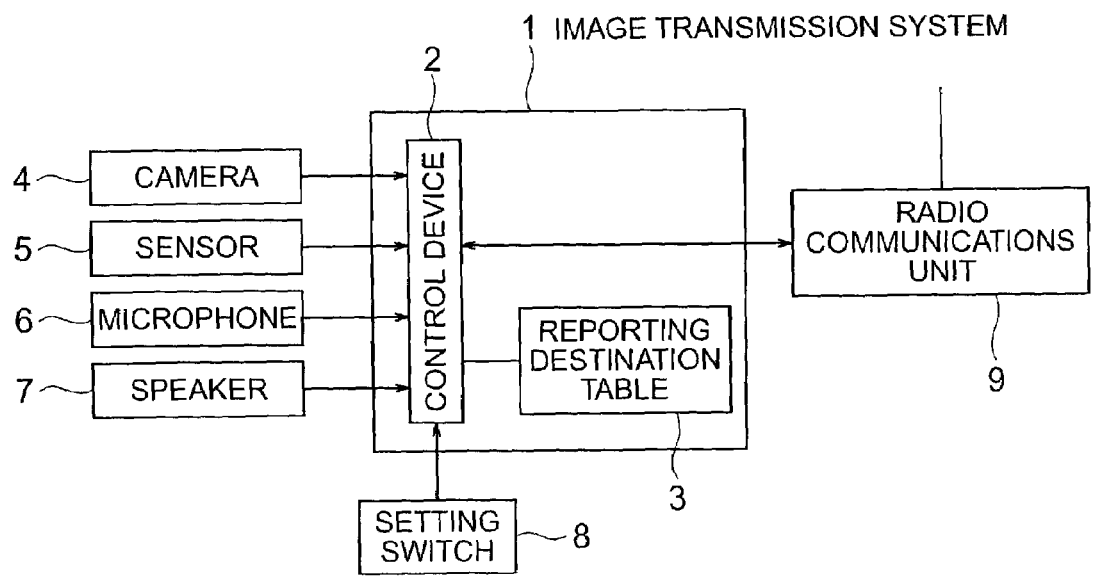
FIG. 2 is a block diagram showing a structure of the vehicle antitheft device in accordance with Embodiment 1 of the present invention.

FIG. 1 and FIG. 2 are an explanatory diagram and a block diagram showing a structure of a vehicle antitheft device in accordance with Embodiment 1 of the present invention. As shown in FIG. 1, in an instrument panel of a vehicle, there are provided: a camera 4 provided at a position from which a driver in a normal seated position and an external area can be captured through a window beside a driver's seat, a display 21 with a built-in speaker 7 serving as a warning device, and an near-infrared illumination device 22. These are connected to a control device 2 of an image transmission system 1, and a radio communications unit 9 is connected to the control device 2.

Further, as shown in FIG. 2, in addition to the camera 4, the control device 2 is connected with a sensor 5, a microphone 6 and the speaker 7. A setting switch 8 is used to set an alert state, and when the sensor 5 emits a signal indicating that a door has been opened, a determination that an abnormality has occurred is made based on the signal from the sensor 5, and data indicating the abnormality occurrence, an image signal from the camera 4, and a sound signal collected by the microphone 6, are reported via the radio communications unit 9 to a security company or other such reporting destinations which are stored in a reporting destination table 3.

Figure 3:
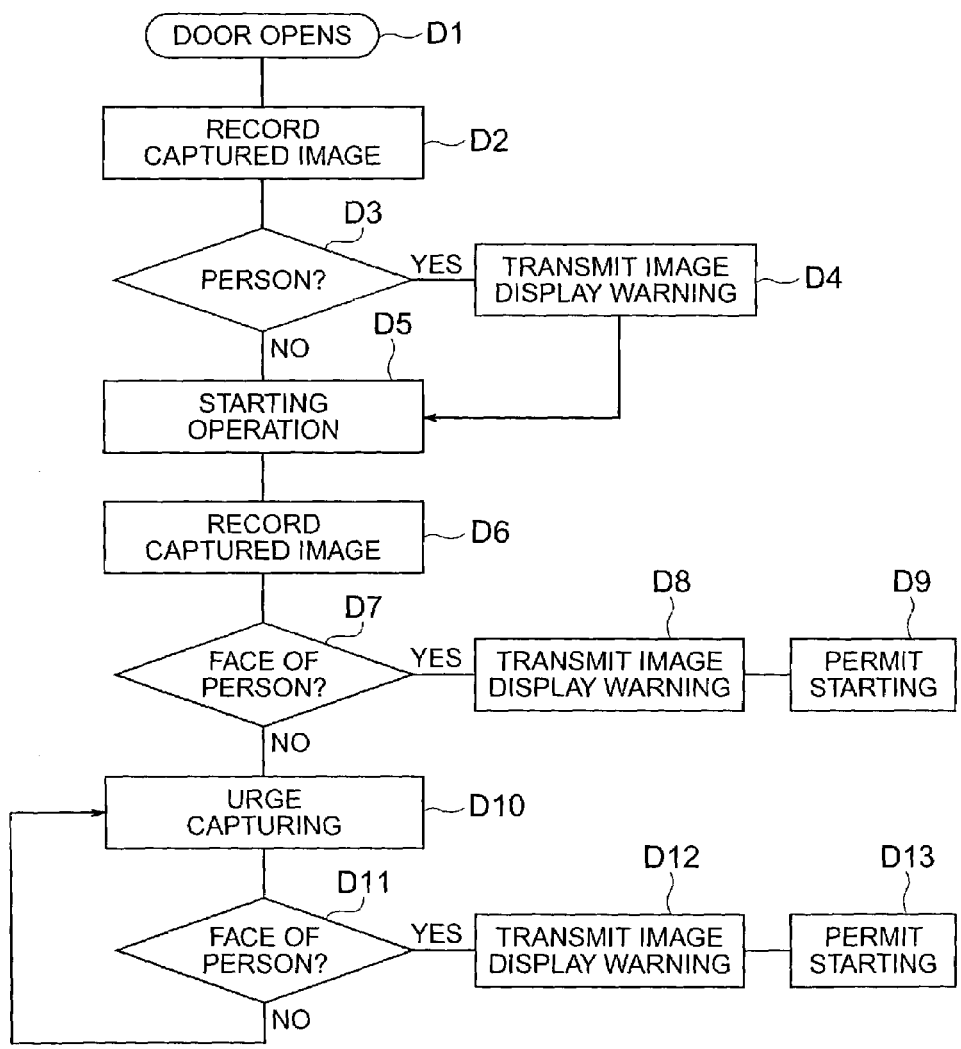
FIG. 3 is a flowchart for explaining operations of the vehicle antitheft device in accordance with Embodiment 1 of the present invention.

Next, explanation is made of operations according to the above-mentioned structure, mainly centered on control operations of the control device 2 shown in FIG. 3. First, in a state where the setting switch 8 is used to set the alert state, and the door of the vehicle is locked, when an unlocking operation is performed (step D1), the control device 2 turns on the near-infrared illumination device 22 if the surroundings are dark, and then operates the camera 4, to obtain an image every several seconds up to a certain number of images, and records them into a built-in memory (step D2). Then, the control device 2 conducts image processing to judge whether or not a face of a person is in the obtained images (step SD3).

If the face of a person is captured, a warning that a face image has been obtained is performed using the display 21 and the speaker 7 serving as the warning device, and simultaneously, the image in which the face is captured is sent via the radio communications unit 9 over the Internet to an address of an owner of the vehicle by electronic mail (step D4). In a case where the person unlocking the door is unauthorized, the obtaining of an evidence image serves as a deterrent, thus exhibiting an antitheft effect at that point in time.

Further, also in a case where an operator performed an engine starting operation (step D5), the image capturing and image storing are performed (step D6), and it is judged whether or not the face of a person is captured in the obtained images (step D7). If the face of a person is captured, a warning that the face image has been obtained is performed using the display 21 and by audio, and the image in which the face is captured is sent via the radio communications unit 9 over the Internet to the given address of the vehicle owner or the like by electronic email (step D8), and simultaneously, starting of the engine is permitted (step D10).

Even in a case where transmission could not be performed due to a status of electric waves, the starting of the engine is permitted and resending is attempted after a given amount of time. If the operator knows the existence of the camera 4 and has hidden the camera 4 or performed some other such operation, the control device 2 judges that the image obtained at step D6 is not the face image (step D7), and uses the warning device to urge the operator to let his/her face be captured (step D10). If the operator still does not let his/her face be captured, the control device 2 does not permit the starting of the engine.

Further, after the control device 2 urges the operator by means of the warning device, it distinguishes whether or not the image captured by the camera 4 is the face of a certain person (step D11). In a case where the captured image is the face image of the person, the image is transmitted by the radio communications unit 9, and after performing the warning by the warning device, it approves the starting of the vehicle (step D12 through step D13).

Therefore, in order to start the engine, the face image must remains as evidence, and this deters the theft. Further, the face image is sent to the certain address even in a case where the operator is legitimate, and it is stored, but this does not become a problem due to a recent tendency of increased server capacity.

Further, since the image evidence is sent to the certain address by electronic mail immediately after it is captured, the unauthorized operator cannot destroy the evidence even if he/she disassembles the vehicle.

Further, in a case where a legitimate owner learns of the criminal act while the criminal act is being performed due to an electronic mail sent to his/her cellular phone or the like, the owner can send a command from the cellular phone to the control device 2 via the radio communications unit 9 of the vehicle to disable the movement of the vehicle, or can emit an alarm sound, a warning, a light or the like to intimidate the illegitimate operator.

Embodiment 2

Figure 4:
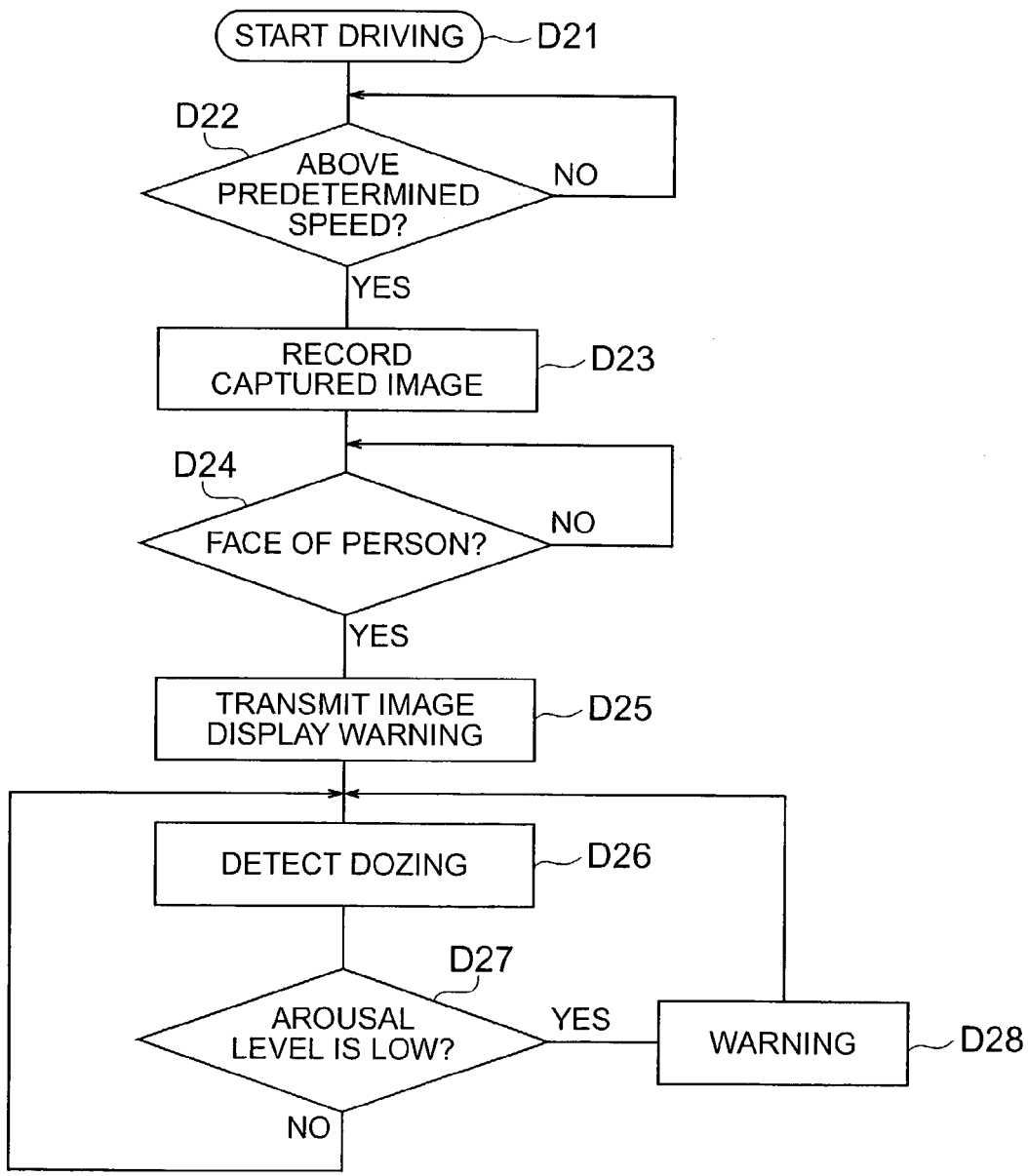
FIG. 4 is a flowchart for explaining operations of a vehicle antitheft device in accordance with Embodiment 2 of the present invention.

FIG. 4 is a flowchart showing an operation of the vehicle antitheft device in accordance with Embodiment 2 of the present invention, mainly a control operation by the control device 2. Hereinafter, the control operation is explained, making reference to the flowchart shown in FIG. 4. First, operation is started (step D21), and when a certain speed of the vehicle is reached (step D22), the control device 2 turns on the near-infrared illumination device 22 if the surroundings are dark, and then operates the camera 4, obtains the images, and records them (step D23).

The control device 2 performs the image processing to judge whether or not the face of a person is captured in the obtained image (step D24). If the face of the person is captured, a warning that a face image is captured is performed using the display 21 and the speaker 7, and simultaneously, the image in which the face is captured is sent via the radio communications unit 9 over the Internet to the address of the vehicle owner by electronic mail (step D25). It is conceivable that a face photograph of a person or a doll is shown to the camera 4 while the vehicle is stopped, in order to contrive recognition of a person. However, this is difficult while driving, and the face image can be obtained more definitely.

While the vehicle is running, the control device 2 uses the camera 4 to constantly observe eye blinks of the driver. Based on a number of times and speed of the blinks, an arousal level of the driver can be estimated/detected using a known arousal level estimating technique (step D26). In a case where it is judged that the arousal level is low, a warning is emitted (step D27 through step D28). Arousal level estimation for use in vehicles still is costly and is not popular at present. However, if the vehicle antitheft device as well as the control device and camera are owned together, it can be realized inexpensively, and diffusion can be promoted.

Embodiment 3

Note that, in the above-mentioned Embodiment 1 and Embodiment 2, the control device 2 used the image processing on the face image obtained by the camera 4 for the recognition of a person. However, when the operator performs the engine starting operation, vocalization can be urged and recognition of a sound obtained by the microphone 6 is used to recognize a person. The use of sound is less powerful as an evidence. However, since the camera does not have to be used, an inexpensive vehicle antitheft device can be obtained.

Embodiment 4

Further, in the above-mentioned Embodiment 1 through Embodiment 3, for the recognition of a person, the control device 2 judged only whether or not it is the face or the voice of a person. However, it is also possible to judge whether or not the face or the voice is that of a particular individual, such as the owner or family of the owner or the like. In the case where the judgment is made from the face, it may be made based on a wink or other such particular movement, whereas in the case where the judgment is made from the voice, a predetermined code word may be used. Accordingly, while this is inconvenient in a case where the vehicle is lent to someone, the security level can be raised.

Embodiment 5

Further, in Embodiment 1 through Embodiment 4, when it was judged that a person is not recognized, the starting of the engine was merely not permitted. However, it is also possible to emit an alarm sound, a warning, a light or the like to intimidate. As a result, the antitheft effect can be improved.

Embodiment 6

Further, in Embodiment 1 through Embodiment 5, the operations of the operator served as a trigger. However, the control device 2 may also be configured to start the vehicle antitheft operation by detection of an abnormality of vibration, impact, sound or heat by the sensor 5.

As described above, in accordance with the present invention, a control operation for vehicle antitheft is executed based on a determination of the face or the voice of the human trying to operate the vehicle. Therefore, even without contracting with a security company or the like, the unauthorized operation and theft can be prevented and the vehicle antitheft device exhibiting a strong vehicle antitheft effect can be obtained.

What is claimed is:

1. A vehicle antitheft device, comprising:
   a camera; and
   a control device for distinguishing whether an image captured by the camera is a face of a human,
   wherein, based on a distinction result, the control device executes a control operation for vehicle theft prevention,
   wherein, when vehicle speed reaches a predetermined level after the vehicle is started, the control device performs control such that the image captured by the camera is recorded, and when the captured image is the face image of the human, the image is transmitted by means of a radio communications unit, and after a warning is performed by means of a warning device, an arousal level of a driver is detected, and in a case where the arousal level is low, the driver is warned by means of the warning device.

2. A vehicle antitheft device according to claim 1, wherein the camera is provided at a position from which the camera can capture a driver in a normal seated position and an external area through a window beside a driver's seat.

3. A vehicle antitheft device according to claim 2,
   wherein the control device performs control such that when the image captured by the camera is recorded, a judgment is made as to whether the recorded captured image is a face image of a person, and when the recorded captured image is the face image, the image is transmitted to a predetermined reporting destination by means of the radio communications unit.

4. A vehicle antitheft device according to claim 3, wherein, when the recorded image is the face image of a person, the warning device performs a warning that the face image was obtained.

5. A vehicle antitheft device according to claim 1, wherein the control device distinguishes whether a face or a voice of a person is captured based on particular movement or a predetermined code word.

6. A vehicle antitheft device according to claim 1, wherein the control device executes an antitheft operation by emitting an alarm sound, a warning, or a light to intimidate when judged that a person is not recognized.

7. A vehicle antitheft device according to claim 1, further comprising a sensor for detecting an abnormality of vibration, impact, sound or heat,
wherein the control means starts control operations for preventing theft of an automobile based on an abnormality detection signal by the sensor.

8. The vehicle antitheft device according to claim 1, wherein the warning is displayed on a display and emitted from a speaker.

9. The vehicle antitheft device according to claim 7, wherein the movement of the vehicle is disabled when the abnormality is detected.

10. A vehicle antitheft device, comprising:
a camera; and
a control device for distinguishing whether an image captured by the camera is a face of a human,
wherein, based on a distinction result, the control device executes a control operation for vehicle theft prevention,
wherein, when vehicle speed reaches a predetermined level after the vehicle is started, the control device performs control such that the image captured by the camera is recorded, and when the captured image is the face image of the human, the image is transmitted by means of a radio communications unit, and after a warning is performed by means of a warning device, an arousal level of a driver is detected, and in a case where the arousal level is low, the driver is warned by means of the warning device, and
further comprising:
a microphone; and
a control device for distinguishing whether a sound captured by the microphone is a voice of a human,
wherein, based on a distinction result, the control device executes a control operation for vehicle theft prevention.

11. A vehicle antitheft device, comprising:
a camera;
a control device for distinguishing an image captured by the camera; and
a radio communications unit inside the vehicle,
wherein, based on a distinction result, the control device executes a control operation for vehicle theft prevention,
wherein, the captured image is transmitted to a predetermined reporting destination by means of the radio communications unit, and
wherein, an engine start operation is permitted when the captured image is an image of an authorized user, and
wherein, an engine state operation is permitted when the captured image is an image of an unauthorized user and a warning is displayed to the unauthorized user that an image of the unauthorized user has been captured.

12. The vehicle antitheft device according to claim 11, wherein the control device transmits the captured image by the radio communications unit, and permits the engine starting operation after performing a warning by a warning device.

* * * * *